(12) United States Patent
Li et al.

(10) Patent No.: US 11,334,321 B2
(45) Date of Patent: May 17, 2022

(54) TRUE RANDOM NUMBER GENERATOR BASED ON PERIOD JITTER

(71) Applicant: QUALCOMM Incorporated, San Diego, CA (US)

(72) Inventors: Rui Li, San Diego, CA (US); De Lu, San Diego, CA (US); Venkat Narayanan, San Diego, CA (US); Srivatsan Chellappa, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 104 days.

(21) Appl. No.: 16/913,631

(22) Filed: Jun. 26, 2020

(65) Prior Publication Data
US 2021/0405973 A1    Dec. 30, 2021

(51) Int. Cl.
*G06F 7/58*         (2006.01)
(52) U.S. Cl.
CPC .................................... *G06F 7/588* (2013.01)
(58) Field of Classification Search
CPC ........................................................ G06F 7/588
USPC ......................................................... 708/255
See application file for complete search history.

(56) References Cited

U.S. PATENT DOCUMENTS

| | | | | |
|---|---|---|---|---|
| 9,983,262 | B1* | 5/2018 | Track | G01R 31/3187 |
| 11,190,495 | B2* | 11/2021 | Jaroch | H04L 9/0894 |
| 2011/0169580 | A1* | 7/2011 | Dodrill | H03B 29/00 |
| | | | | 331/56 |
| 2016/0202953 | A1* | 7/2016 | Chen | G06F 7/588 |
| | | | | 708/250 |

OTHER PUBLICATIONS

GeeksforGeeks, A computer science portal for geeks, https://www.geeksforgeeks.org/magnitude-comparator-in-digital-logic/, Apr. 4, 2020 (Year: 2020).*

* cited by examiner

*Primary Examiner* — Emily E Larocque
(74) *Attorney, Agent, or Firm* — Loza & Loza, LLP (57) ABSTRACT

A true random number generator (TRNG) for generating a sequence of random numbers of bits is disclosed. The TRNG includes a TRNG cell configured to generate a sequence of bits logically alternating with a mean frequency and with substantially random period jitter; a period monitor configured to generate a first sequence of random bits based on a set of periods of the sequence of logically alternating bits; and a sampling circuit configured to sample the first sequence of random bits in response to a sampling clock to generate a second sequence of random bits.

30 Claims, 7 Drawing Sheets

TRUE RANDOM NUMBER GENERATOR BASED ON PERIOD JITTER

FIELD

Aspects of the present disclosure relate generally to true random number generators (TRNGs), and in particular, to a TRNG that generates a sequence of substantially random bits based on period-to-period variation or period jitter.

DESCRIPTION OF RELATED ART

True random number generators (TRNGs) are used to generate random numbers or bits for use in many applications, such as encrypting data to be transmitted to another device via a wired or wireless medium. The security of the encrypted data typically depends on the randomness of the random numbers or bits generated by a TRNG. The randomness, however, is often degraded by manufacturing mismatch in the components of the TRNG. The degradation in the randomness typically results in a bias in favor of a certain logic value (e.g., a logic one (1) or logic zero (0)). Thus, the random numbers or bits typically have statistically more logic ones (1s) than logic zeros (0s) due to the manufacturing mismatch bias.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus. The apparatus includes a true random number generator (TRNG) cell including an output; a period monitor including an input coupled to the output of the TRNG cell; and a flip-flop including a data input coupled to an output of the period monitor, a clock input to receive a sampling clock, and a data output to generate a sequence of random bits.

Another aspect of the disclosure relates to an apparatus. The apparatus includes a true random number generator (TRNG) cell configured to generate a sequence of bits logically alternating with a mean frequency and substantially random period jitter; a period monitor configured to generate a first sequence of random bits based on a set of periods of the sequence of logically alternating bits; and a sampling circuit configured to sample the first sequence of random bits in response to a sampling clock to generate a second sequence of random bits.

Another aspect of the disclosure relates to a method. The method includes generating a sequence of bits logically alternating with a mean frequency and substantially random period jitter; generating a second sequence of random bits based on a set of periods of the first sequence of random bits; and sampling the second sequence of random bits in response to a sampling clock to generate a third sequence of random bits.

Another aspect of the disclosure relates to an apparatus. The apparatus includes means for generating a sequence of bits logically alternating with a mean frequency and substantially random period jitter; means for generating a first sequence of random bits based on a set of periods of the first sequence of random bits, respectively; and means for sampling the first sequence of random bits in response to a sampling clock to generate a second sequence of random bits.

Another aspect of the disclosure relates to a wireless communication device. The wireless communication device includes a true random number generator including a true random number generator (TRNG) cell including an output, a period monitor including an input coupled to the output of the TRNG cell, and a flip-flop including a data input coupled to an output of the period monitor, a clock input to receive a sampling clock, and a data output to generate a sequence of random bits. The wireless communication device further includes a data source configured to generate data; an encryption circuit configured to encrypt the data based on the sequence of random bits; and a transmitter configured to wirelessly transmit a signal including the encrypted data.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1A:
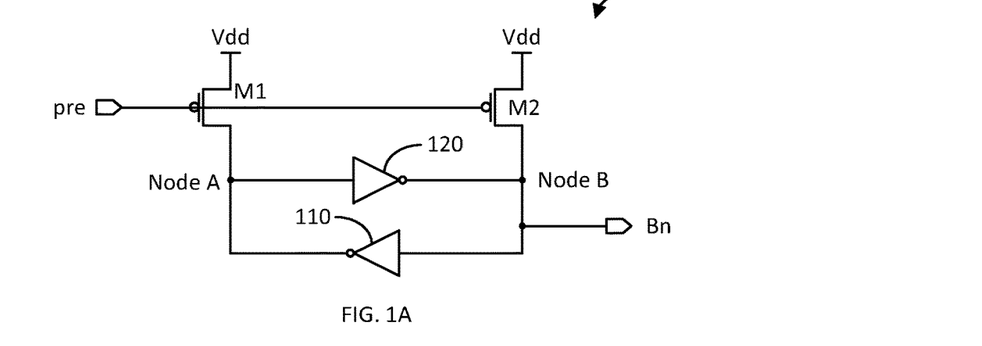
FIG. 1A illustrates a schematic diagram of an example true random number generator (TRNG) cell in accordance with an aspect of the disclosure.

FIG. 1A illustrates a schematic diagram of an example true random number generator (TRNG) cell 100 in accordance with an aspect of the disclosure. The TRNG cell 100 is configured to generate a sequence of substantially random numbers or bits Bn. The TRNG cell 100 includes a pre-charging circuit including a first p-channel metal oxide semiconductor field effect transistor (PMOS FET) M1, a second PMOS FET M2, and cross-coupled inverters 110 and 120. Due to the cross-coupled inverters configuration, the TRNG cell 100 may be referred to as a meta-stable latch based TRNG.

The first PMOS FET M1 is coupled between an upper voltage rail Vdd and a node A, which coincides with an input of cross-coupled inverter 120 and an output of the other cross-coupled inverter 110. Similarly, the second PMOS FET M2 is coupled between the upper voltage rail Vdd and a node B, which coincides with an input of cross-coupled inverter 110 and an output of the other cross-coupled inverter 120. The first and second PMOS FETs M1 and M2 include gates coupled together, and configured to receive a pre-charge signal (pre). The pre-charge signal (pre) may be in the form of a clock (Clk). The output sequence of substantially random bits Bn may be generated at Node B as depicted, or alternatively, at Node A.

Figure 1B:
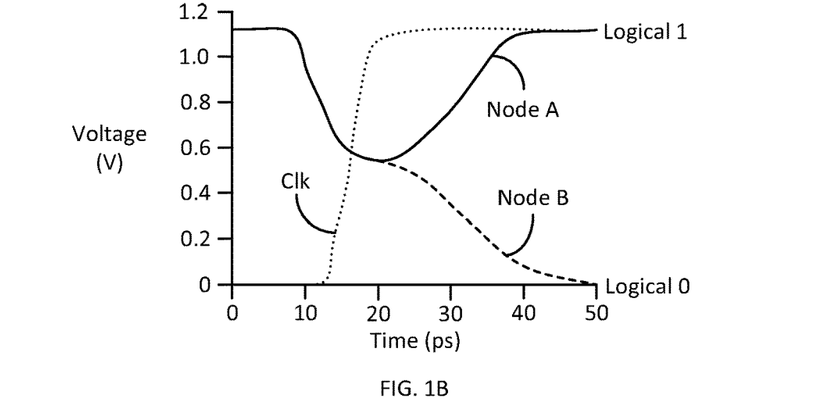
FIG. 1B illustrates a timing diagram of an example operation of the true random number generator (TRNG) cell of FIG. 1A in accordance with another aspect of the disclosure.

FIG. 1B illustrates a timing diagram of an example operation of the true random number generator (TRNG) cell 100 in accordance with another aspect of the disclosure. The x- or horizontal-axis represents time in picoseconds (ps), ranging from 0 ps to 50 ps. The y- or vertical-axis represents voltage in volt (V), ranging from 0V to 1.2V. The pre-charge signal or clock (Clk) is represented as a dotted line. The voltage at Node A is represented as a solid line. The voltage at Node B is represented as a dashed line.

In operation, during time interval 0 ps to 12 ps, the clock (Clk) is at a logic low voltage (e.g., 0V). The logic low voltage at the gates of the first and second PMOS FETs M1 and M2 turn on these devices. Accordingly, the pre-charging circuit pre-charges Nodes A and to substantially Vdd (e.g., ~1.1V). During time interval 12 ps to 20 ps, the clock (Clk) transitions from the logic low voltage to a logic high voltage (e.g., ~1.1V) causing the pre-charging circuit to release the pre-charging of Nodes A and B. During this interval, the channel resistances of the first and second PMOS FETs M1 and M2 increase causing the voltages at Nodes A and B to decrease, for example, to around Vdd/2 or about 0.6V.

During time interval 20 ps to 40 ps, random thermal noise causes one of the cross-coupled inverters, for example, inverter 110 to output a logic high voltage (logic 1), and the other of the cross-coupled inverter 120 to output a logic low voltage (logic 0). If the cross-coupled inverters 110 and 120 are ideally matched, and the cross-coupled inverters 110 and 120 generate the voltages at Nodes A and B based on thermal noise, then generating the logic levels at Nodes A and B by the cross-coupled inverters 110 and 120 is ideally random, with a probability of Node A being at a logic high level and Node B being at a logic low level or vice-versa being 50 percent or 0.5 probability.

However, due to imperfection in the process manufacturing of the TRNG cell 100, the cross-coupled inverters 110 and 120 may not be matched. For instance, each of the cross-coupled inverters 110 and 120 includes a PMOS FET coupled in series with an n-channel metal oxide semiconductor field effect transistor (NMOS FET) between the upper voltage rail Vdd and a lower voltage rail (e.g., ground). Due to manufacturing mismatch, the ratio of the strength of the PMOS FET to the strength NMOS FET may be different in one of the cross-coupled inverter compared to the ratio in the other cross-coupled inverter. If the strength ratio is higher in inverter 110 as compared to that of inverter 120, then the inverter 110 is more likely to output a logic high level, and inverter 120 is more likely to output a logic low level. Conversely, if the strength ratio is higher in inverter 120 as compared to that of inverter 110, then the inverter 120 is more likely to output a logic high level, and inverter 110 is more likely to output a logic low level. This is referred to as the TRNG having a bias towards a particular logic state due to manufacturing mismatch.

Figure 1C:
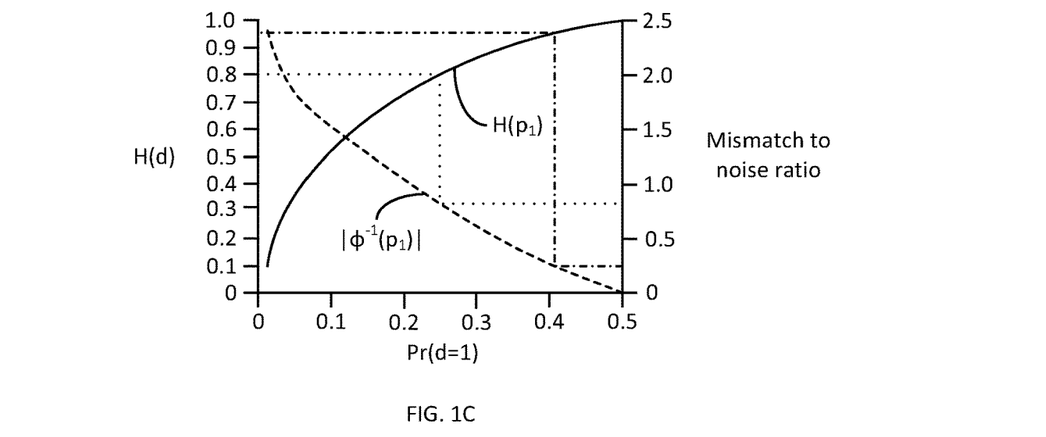
FIG. 1C illustrates a graph depicting example relationships between randomness, mismatch to noise ratio, and probability of an output of the true random number generator (TRNG) cell of FIG. 1A being a particular logic value in accordance with another aspect of the disclosure.

FIG. 1C illustrates a graph depicting example relationships between randomness H(d), mismatch to noise ratio, and probability pr(d=1) of an output of the true random number generator (TRNG) cell 100 being at a particular logic state in accordance with another aspect of the disclosure. The x- or horizontal-axis represents the probability pr(d=1) of the output Bn of the TRNG cell 100 being at a particular logic state (e.g., d=logic "1"). In this example, the range of the x- or horizontal-axis is from zero (0) probability to 0.5 probability. The y- or vertical-axis on the left represents randomness of the output Bn ranging from zero (0) randomness to one (1) (e.g., 100%) randomness. The y- or vertical-axis on the right represents the mismatch to noise ratio ranging from zero (0) to 2.5. The solid line represents randomness $H(p_1)$ for a given probability $p_1$ of Bn being a logic one, and the dashed line represents mismatch to noise ratio $|\varphi^{-1}(p_1)|$ for the given probability $p_1$.

Considering a couple of examples, if the TRNG cell 100 outputs a sequence of random bits Bn with a probability $p_1$ of 0.25 that it is a logic one, the corresponding randomness $H(p_1)$ is 0.8, and the mismatch to noise ratio is about 0.75. If a probability $p_1$ of Bn being a logic one is 0.4 or greater, then the randomness $H(p_1)$ is 0.95 or greater, and the mismatch to noise ratio is about 0.25 or less. Thus, if high randomness H(d) is desired in order to set the probability of Bn being a logic one to as close as 0.5, then the thermal noise should be four (4) times greater than the mismatch.

Figure 2A:
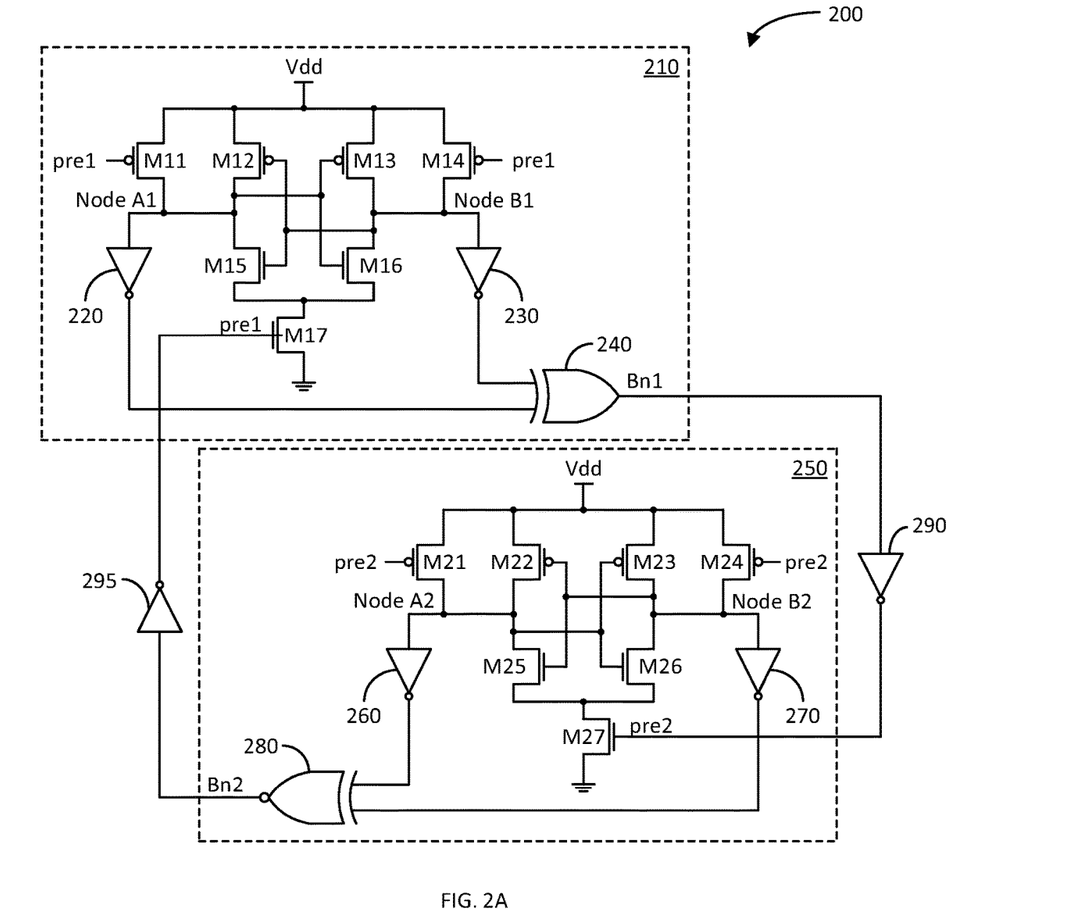
FIG. 2A illustrates a schematic diagram of another example true random number generator (TRNG) cell in accordance with another aspect of the disclosure.

FIG. 2A illustrates a schematic diagram of another example true random number generator (TRNG) cell 200 in accordance with another aspect of the disclosure. The TRNG cell 200 is configured to generate a sequence of logically alternating bits Bn1 and/or Bn2 (e.g., 1010101010 etc.) with a mean frequency and substantially random period jitter based on substantially random duty cycles, as discussed in more detail herein. In other words, the TRNG cell 200 is similar to a noisy clock with period jitter much higher than a clock for driving sequential circuits. The TRNG cell 200 is in contrast to TRNG cell 100, which generates bits that are logically random (e.g., 1001011001 etc.). The TRNG cell 200 may be referred to as a settling time based TRNG as the time interval ("evaluation period") for the outputs Bn1 and/or Bn2 to settle to particular logic states varies with thermal noise.

More specifically, the TRNG cell 200 includes a first TRNG sub-cell 210 cross-coupled with a second TRNG sub-cell 250 to form a ring oscillator (RO). The first TRNG sub-cell 210 includes a PMOS FET M12 coupled in series with NMOS FETs M15 and M17 in that order between an upper voltage rail Vdd and a lower voltage rail (e.g., ground). The first TRNG sub-cell 210 further includes a PMOS FET M13 coupled in series with NMOS FETs M16 and M17 in that order between the upper voltage rail and the lower voltage rail (e.g., ground). The gates of PMOS FET M12 and NMOS FET M15 are coupled together, and to the drains of PMOS FET M13 and NMOS FET M16. Similarly, the gates of PMOS FET M13 and NMOS FET M16 are coupled together, and to the drains of PMOS FET M12 and NMOS FET M15. Thus, the FET pairs M12/M15 and M13/M16 form cross-coupled inverters, respectively.

The first TRNG sub-cell 210 further includes a first pre-charging circuit including a PMOS FET M11 coupled between the upper voltage rail and the drains (output) and gates (input) of the cross-coupled inverters M12/M15 and M13/M16, respectively, which is designated as Node A1. Additionally, the first pre-charging circuit includes a PMOS FET M14 coupled between the upper voltage rail and the drains (output) and gates (input) of the cross-coupled inverters M13/M16 and M12/M15, respectively, which is designated as Node B1. The gates of the PMOS FETs M11 and M14, and the gate of NMOS FET M17 are configured to receive a first pre-charge signal pre1 from the second TRNG sub-cell 250, as discussed further herein. Accordingly, the first pre-charging circuit also includes the NMOS FET M17.

The first TRNG sub-cell 210 further includes inverters 220 and 230, and an exclusive-OR (XOR) gate 240. The inverter 220 includes an input coupled to Node A1 and an output coupled to a first input of the XOR gate 240. The inverter 230 includes an input coupled to Node B1 and an output coupled to a second input of the XOR gate 240. The XOR gate 240 is configured to generate the first sequence of logically alternating bits Bn1. An inverter 290 inverts the Bn1 signal to generate a second pre-charge signal (pre2) for the second TRNG sub-cell 250, as discussed further herein.

The second TRNG sub-cell 250 includes a PMOS FET M22 coupled in series with NMOS FETs M25 and M27 in that order between the upper voltage rail Vdd and the lower voltage rail (e.g., ground). The second TRNG sub-cell 250 further includes a PMOS FET M23 coupled in series with NMOS FETs M26 and M27 in that order between the upper voltage rail and the lower voltage rail (e.g., ground). The gates of PMOS FET M22 and NMOS FET M25 are coupled together, and to the drains of PMOS FET M23 and NMOS FET M26. Similarly, the gates of PMOS FET M23 and NMOS FET M26 are coupled together, and to the drains of PMOS FET M22 and NMOS FET M25. Thus, the FET pairs M22/M25 and M23/M26 form cross-coupled inverters, respectively.

The second TRNG sub-cell 250 includes a second pre-charging circuit including a PMOS FET M21 coupled between the upper voltage rail and the drains (output) and gates (input) of the cross-coupled inverters M22/M25 and M23/M26, respectively, which is designated as Node A2. Additionally, the second pre-charging circuit includes a PMOS FET M24 coupled between the upper voltage rail and the drains (output) and gates (input) of the cross-coupled inverters M23/M26 and M22/M25, respectively, which is designated as Node B2. The gates of the PMOS FETs M21 and M24, and the gate of NMOS FET M27 are configured to receive the second pre-charge signal pre2 generated by the XOR gate 240 of the first TRNG sub-cell 210 via an inverter 290.

The second TRNG sub-cell 250 further includes inverters 260 and 270, and an exclusive-NOR gate (XNOR) 280. The inverter 260 includes an input coupled to Node A2 and an output coupled to a first input of the XNOR gate 280. The inverter 270 includes an input coupled to Node B2 and an output coupled to a second input of the XNOR gate 280. The XNOR gate 280 is configured to generate a second sequence of logically alternating bits Bn2. An inverter 295 inverts the Bn2 signal to generate the first pre-charge signal (pre1) for the first TRNG sub-cell 210.

Figure 2B:
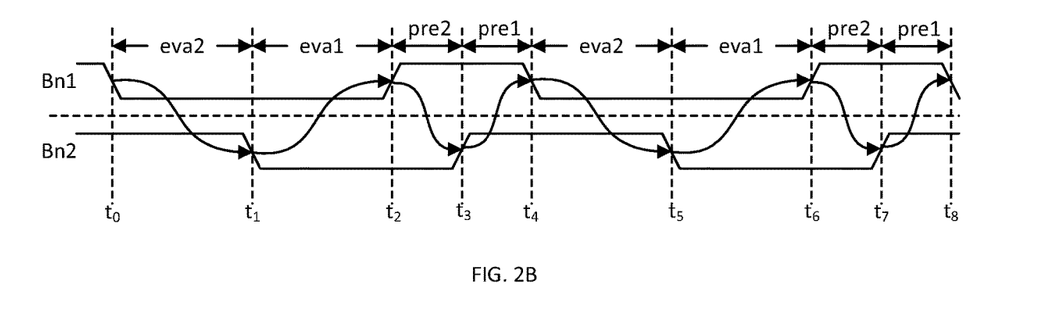
FIG. 2B illustrates a timing diagram of an example operation of the true random number generator (TRNG) cell of FIG. 2A in accordance with another aspect of the disclosure.

FIG. 2B illustrates a timing diagram of an example operation of the true random number generator (TRNG) cell 200 in accordance with another aspect of the disclosure. The x- or horizontal-axis of the timing diagram represents time. The top row of the timing diagram represents the output Bn1 of the first TRNG sub-cell 210, and the bottom row of the timing diagram represents the output Bn2 of the second TRNG sub-cell 250. As discussed, the output of the first TRNG sub-cell 210 being coupled to the input of the second TRNG sub-cell 250, and the output of the second TRNG sub-cell 250 being coupled to the input of the first TRNG sub-cell 210 forms a ring oscillator (RO) causing the outputs Bn1 to Bn2 to oscillate between logically alternating bits.

For instance, at time $t_0$, the XOR gate 240 generates Bn1 at a logic low state. In response, the inverter 290 inverts the logic low state of the Bn1 signal to generate the second pre-charge signal pre2 for the second TRNG sub-cell 250 at a logic high state. The logic high state of the second pre-charge signal pre2 initiates a second evaluation period (eva2) of the second TRNG sub-cell 250, where Nodes A2 and B2 settle at a particular set of complementary logic states at time $t_1$. In response to the complementary states, the XNOR 280 of the second TRNG sub-cell 250 generates Bn2 at a logic low state. The inverter 295 inverts the logic low state of the Bn2 signal to generate the first pre-charge signal pre1 for the first TRNG sub-cell 210 at a logic high state. The logic high state of the first pre-charge signal pre1 initiates a first evaluation period (eva1) of the first TRNG sub-cell 210, where Nodes A1 and B1 settle at a particular set of complementary logic states at time $t_2$.

In response to the complementary states, the XOR gate 240 of the first TRNG sub-cell 210 generates the Bn1 signal at a logic high state. In response, the inverter 290 generates the second pre-charge signal (pre2) at an asserted or logic low state. The asserted second pre-charge signal (pre2) initiates a second pre-charge phase of the second TRNG sub-cell 250, where Nodes A2 and B2 are charged to logic high states. In response to the logic high states, the XNOR gate 280 generates the Bn2 signal at a logic high state at time $t_3$. In response, the inverter 295 generates the first pre-charge signal (pre1) at an asserted or logic low state. The asserted state of the first pre-charge signal (pre1) initiates the first pre-charge phase of the first TRNG sub-cell 210.

During first pre-charge phase, the first TRNG sub-cell 210 causes the Nodes A1 and B2 to be charged to logic high states. In response to the logic high states, the XOR gate 240 generates the Bn1 signal at a logic low state. In response, the inverter 290 generates the second pre-charge signal at a logic high state causing the TRNG sub-cell 250 to enter another second evaluation phase (eva2) at time $t_4$. This cycle continues to repeat to initiate another first evaluation phase (eva1) of the first TRNG sub-cell 210 at time $t_5$, another second pre-charge phase of the second TRNG sub-cell 250 at time $t_6$, another first pre-charge phase of the first TRNG sub-cell 210 at time $t_7$, and so on.

In the case of TRNG cell 200, the randomness due to thermal noise results in variations in the durations of the first and second evaluation phases eva1 and eva2. The mismatch of the cross-coupled inverters M12/M15 and M13/M16 of the first TRNG sub-cell 210 is cancelled out in generating the Bn1 signal at the inputs of the XOR gate 240 as it does not care of the configuration of the complementary states of Nodes A1 and B1. However, the mismatch of the cross-coupled inverters M12/M15 and M13/M16 results in the first evaluation period eva1 being biased towards a certain first duration.

Similarly, the mismatch of the cross-coupled inverters M22/M25 and M23/M26 of the second TRNG sub-cell 250 is cancelled out in generating the Bn2 signal at the inputs of the XNOR gate 280 as it does not care of the configuration of the complementary states of Nodes A2 and B2. However, the mismatch of the cross-coupled inverters M22/M25 and M23/M12 results in the second evaluation period eva2 being biased towards a certain second duration, which may be different than the first duration.

As discussed in more detail herein, the output Bn2 of the second TRNG sub-cell 250 is periodically sampled by a sampling circuit (e.g., flip-flop) driven by a periodic sampling clock. As the timing diagram illustrates, the Bn2 signal is at a logic high state during the second evaluation phase (eva2) and at a logic low state during the first evaluation phase (eva1). As discussed above, due to mismatch in the mismatch between the cross-coupled inverters of the first TRNG sub-cell 210 and the cross-coupled inverters of the second TRNG cell 220, the durations of the first and second evaluation phases may have different biases. Accordingly, the sampling of the Bn2 signal then generates a sequence of random numbers or bits that is biased towards the logic state corresponding to the larger duration of the first and second evaluation phases. The randomness of the bits generated based on the settling-time based TRNG cell 200 may be better than the randomness of the bits generated by the meta-stable based TRNG cell 100 because the mismatches in the first and second TRNG sub-cells 210 and 250 may, to some degree, cancel out.

Figure 3:
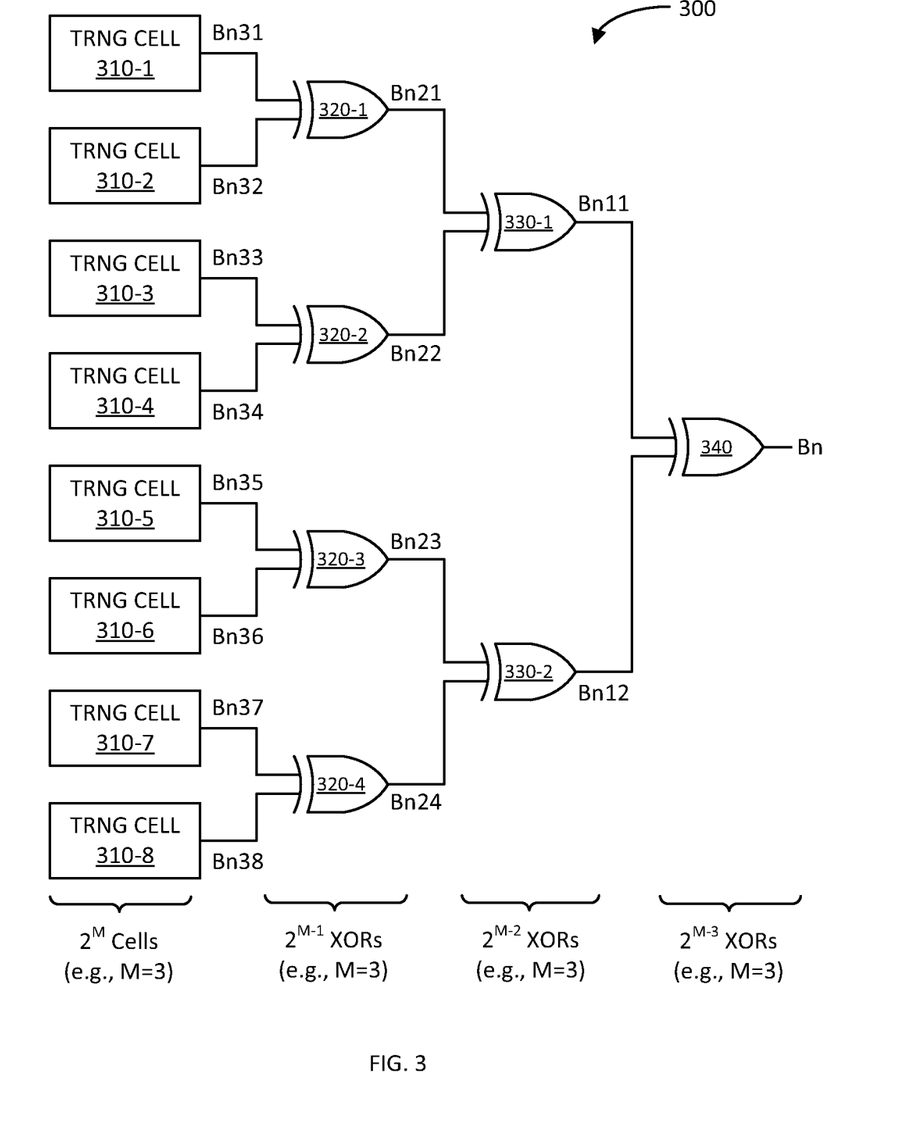
FIG. 3 illustrates a block/schematic diagram of another example true random number generator (TRNG) cell in accordance with another aspect of the disclosure.

FIG. 3 illustrates a block/schematic diagram of another example true random number generator (TRNG) cell 300 in accordance with another aspect of the disclosure. Another technique of improving the randomness of numbers or bits generated by a TRNG is to configure two or more TRNG cells in parallel. The TRNG cell 300 is an example of such TRNG configuration.

The TRNG cell 300 includes a set of parallel TRNG sub-cells 310-1 to 310-$2^M$, where M may be any integer. For instance, in this example, M is 3. The set of TRNG sub-cells 310-1 to 310-8 generate a set of sequences of random bits Bn31 to Bn38, respectively. Each of the set of parallel TRNG sub-cells 310-1 to 310-8 may be configured similar to TRNG cell 200.

The TRNG 300 further includes a first hierarchical set of XOR gates 320-1 to 320-4. The TRNG sub-cells 310-1 and 310-2 include outputs coupled to inputs of the XOR gate 320-1, respectively; the TRNG sub-cells 310-3 and 310-4 include outputs coupled to inputs of XOR gate 320-2, respectively; the TRNG sub-cells 310-5 and 310-6 include outputs coupled to inputs of XOR gate 320-3, respectively; and the TRNG sub-cells 310-7 and 310-8 include outputs coupled to inputs of XOR gate 320-4, respectively. The first hierarchical set of XOR gates 320-1 to 320-4 are configured to exclusive OR pairs of the set of sequences of logically alternating bits Bn31/Bn32, Bn33/Bn34, Bn35/Bn36, and Bn37/Bn38 to generate a set of sequences of logically alternating bits Bn21, Bn22, Bn23, and Bn24, respectively.

The TRNG 300 further includes a second hierarchical set of XOR gates 330-1 to 330-2. The XOR gates 320-1 and 320-2 of the first hierarchical set include outputs coupled to inputs of XOR gate 330-1, respectively; and the XOR gates 320-3 and 320-4 of the first hierarchical set include outputs coupled to inputs of XOR gate 330-2, respectively. The second hierarchical set of XOR gates 330-1 and 330-2 are configured to exclusive OR pairs of the set of sequences of logically alternating bits Bn21/Bn22 and Bn23/Bn24 to generate a set of sequences of logically alternating bits Bn11 and Bn12, respectively.

The TRNG 300 further includes a third (or top, in this example) hierarchical set of XOR gate 340. The XOR gates 330-1 and 330-2 of the second hierarchical set include outputs coupled to inputs of XOR gate 340, respectively. The third hierarchical set of XOR gate 340 is configured to exclusive OR pairs of the set of sequences of logically alternating bits Bn11/Bn12 to generate an output sequence of logically alternating bits Bn.

Although by using a set of parallel TRNG cells, and combining their respective sets of sequences of logically alternating bits using hierarchical sets of XOR gates, the randomness of the duty cycle of the output sequence of logically alternating bits Bn is improved. The TRNG cell 300 is built upon the TRNG cell 200, which is subjected to reduced randomness due to manufacturing mismatch as previously discussed. Consequently, the randomness of the duty cycle of the output sequence of logically alternating bits Bn of the TRNG cell 300 is subject to manufacturing mismatch.

Figure 4A:
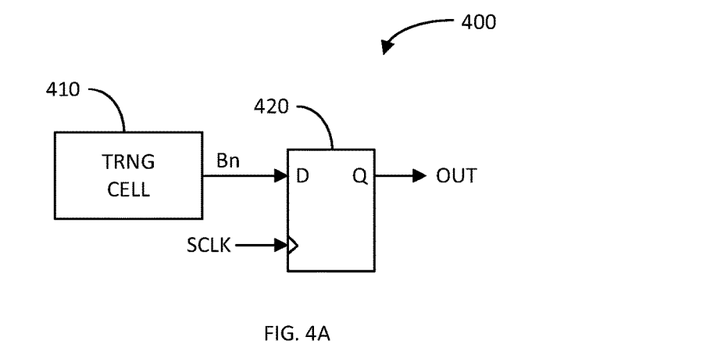
FIG. 4A illustrates a schematic diagram of another example true random number generator (TRNG) in accordance with another aspect of the disclosure.

FIG. 4A illustrates a schematic diagram of another example true random number generator (TRNG) 400 in accordance with another aspect of the disclosure. As previously mentioned, the sequence of logically alternating bits generated by the TRNG cell 200 or 300 previously discussed may be sampled by a sampling clock (SCLK). This allows more randomness to accumulate between sampling intervals. For example, the sampling clock (SCLK) may have a frequency of around 10 times less than the mean frequency of the sequence of logically alternating bits to provide sufficient time between sampling intervals to accumulate more randomness.

More specifically, the TRNG 400 includes a TRNG cell 410 and a sampling circuit 420 (e.g., a flip-flop). The TRNG cell 410 may be configured as any one of TRNG cell 200 or 300 previously discussed. Accordingly, the TRNG cell 410 is configured to generate a sequence of bits Bn logically alternating with a mean frequency and substantially random jitter or duty cycles. The TRNG cell 410 includes an output coupled to a data input (D) of the flip-flop 420. The flip-flop 420 includes a clock input configured to receive a sampling clock (SCLK). The flip-flop 420 includes a data output (Q) configured to generate an output sequence of random numbers or bits (Out) by periodically sampling the sequence of logically alternating bits Bn generated by the TRNG cell 410 in response to the sampling clock (SCLK).

Figure 4B:
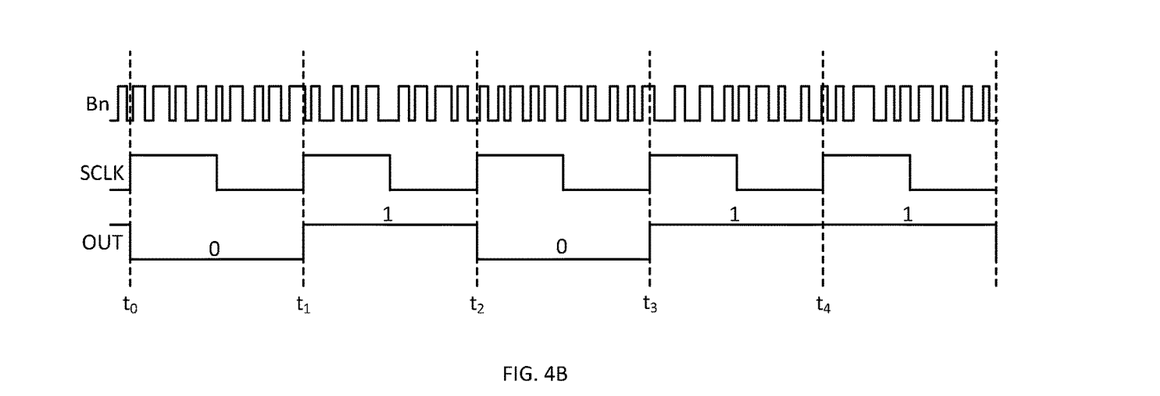
FIG. 4B illustrates a timing diagram of an example operation of the true random number generator (TRNG) of FIG. 4A in accordance with another aspect of the disclosure.

FIG. 4B illustrates a timing diagram of an example operation of the true random number generator (TRNG) 400 in accordance with another aspect of the disclosure. The x- or horizontal-axis represents time. From top to bottom, the y- or vertical-axis represents the voltage level or state of the sequence of logically alternating bits Bn generated by the TRNG cell 410, the sampling clock (SCLK), and the output sequence of random numbers or bits (Out).

As the timing diagram illustrates, the sequence of logically alternating bits Bn generated by the TRNG cell 410 has a mean frequency that is about 10 time greater the frequency of the sampling clock (SCLK). This is apparent in that there are about 10 periods of the signal Bn for each period of the sampling clock (SCLK). The output sequence of random numbers or bits (Out) are the states of Bn at the clocking (rising) edges of the sampling clock (SCLK). For example, during the first rising edge of the sampling clock (SCLK) at time $t_0$, the state of Bn is low. Accordingly, the flip-flop 420 generates the output bit as a logic low. During the second rising edge of the sampling clock (SCLK) at time $t_1$, the state of Bn is high. Accordingly, the flip-flop 420 generates the output bit as a logic high. The sampling of the sequence of logically alternating bits Bn continues to generate the output sequence of random numbers or bits (Out) at low, high, and high in response to rising edges of the sampling clock (SCLK) at times $t_2$, $t_3$, and $t_4$, respectively.

As discussed, the frequency of the sampling clock (SCLK) is configured to be significantly less (e.g., 10× less) than the mean frequency of the sequence of logically alternating bits Bn in order to achieve a particular randomness for the output sequence of random numbers or bits (Out). Furthermore, the frequency of the sampling clock (SCLK) is set to much smaller than the mean frequency of the sequence of logically alternating bits Bn to prevent synchronization effects, where the same bit state is continuously sampled by the flip-flop 420 resulting in significant degradation in the randomness of the output sequence of random numbers or bits (Out). This has the potential drawback of limiting the mean frequency of the output sequence of random numbers or bits (Out).

Figure 5A:
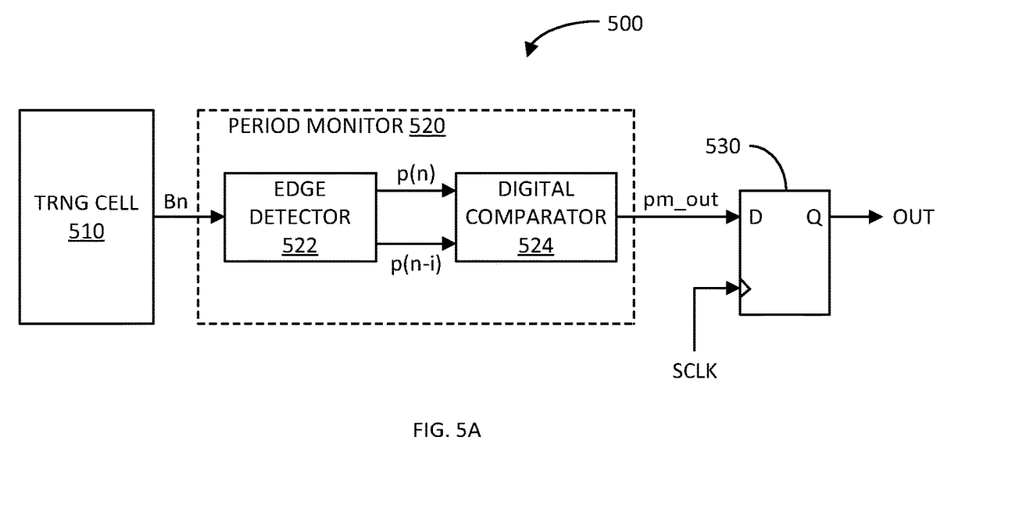
FIG. 5A illustrates a block diagram of another exemplary true random number generator (TRNG) in accordance with another aspect of the disclosure.

FIG. 5A illustrates a block diagram of another exemplary true random number generator (TRNG) 500 in accordance with another aspect of the disclosure. In summary, the TRNG 500 generates a sequence of random numbers or bits (Out) based on variation in periods of a sequence of logically alternating bits Bn generated by a TRNG cell.

As discussed with respect to TRNG 400, the output sequence of random number or bits (Out) generated is subject to randomness degradation due to manufacturing mismatch in these devices. For example, the distribution of logical ones (1s) compared to logical zeros (0s) may not be 50 percent due to variation in the duty cycle (e.g., the first evaluation period (eva1) being statistically longer than the second evaluation period (eva2)). As discussed, this duty cycle variation is due to manufacturing mismatch between TRNG sub-cells 210 and 250. By generating the sequence of random numbers or bits based on variation in the periods or period jitter, degradation in the randomness due to manufacturing mismatch is substantially eliminated because the mismatch effects the duty cycle not the period.

More specifically, the TRNG 500 includes a TRNG cell 510, a period monitor 520, and a sampling circuit 530 (e.g., flip-flop). The TRNG cell 510 is configured to generate a sequence of bits Bn logically alternating with a mean frequency and substantially random period jitter. The TRNG cell 510 may be configured as any one of TRNG cell 200 or 300 previously discussed.

The period monitor 520 is configured to generate a sequence of random numbers or bits pm_out based on variation in the periods (period jitter) in the sequence of logically alternating bits Bn generated by the TRNG cell 510. The period monitor 520 includes an edge detector 522 configured to generate signals p(n) and p(n−i) indicative different periods (time lengths of two different cycles) of the sequence of logically alternating bits Bn. The signal p(n) may represent the duration or length of the current period and the signal p(n−i) represents the length or duration of the $i^{th}$ previous period (where "i" may be an integer of one or more). The period monitor 520 further includes a digital comparator 524 configured to generate the sequence of random bits pm_out based on a comparison of the signal p(n) with the signal p(n−i).

As an example, if the signals p(n) and p(n−1) indicate that the current period is greater than the immediate previous period, then the digital comparator 524 may generate or set the current bit pm_out(n) of the sequence of random bits pm_out as a logic one. If the signals p(n) and p(n−1) indicate that the current period is less than the immediate previous period, then the digital comparator 524 may generate or set the current bit pm_out(n) of the sequence of random bits pm_out as a logic zero. If the signals p(n) and p(n−1) indicate that the current period is substantially the same as the previous period based on the resolution of the edge detector 522, then the digital comparator 524 may generate or set the current bit pm_out(n) of the sequence of random bits pm_out with the same value as the immediate previous pm_out(n−1). It shall be understood that the digital comparator 524 may generate the sequence of random bits pm_out in different manners based on the values of p(n) and p(n−i).

The sampling circuit or flip-flop 530 is configured to sample the sequence of random bits pm_out generated by the period monitor 520 in response to a sampling clock (SCLK) to generate an output sequence of random numbers or bits Out. Accordingly, the output of the period monitor 520, at which the sequence of sequence of random bits pm_out is generated, is coupled to a data input (D) of the flip-flop 530. The flip-flop 530 further includes a clock input configured to receive the sampling clock (SCLK). The flip-flop 530 includes a data output (Q) configured to generate the output sequence of random numbers or bits OUT.

Figure 5B:
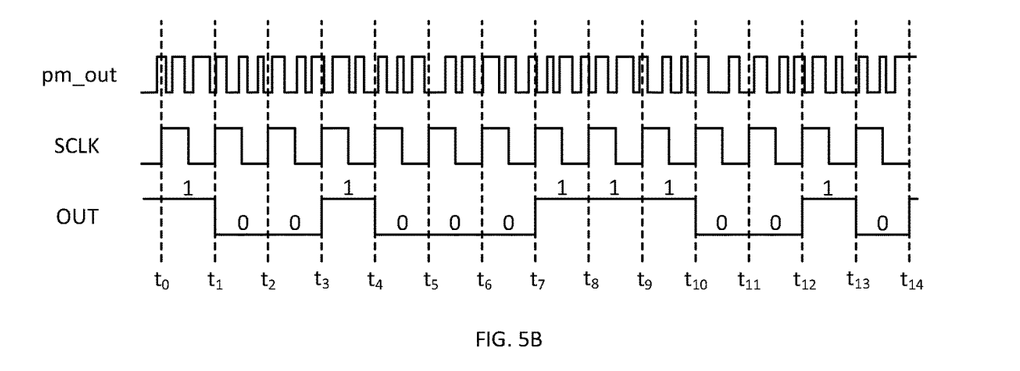
FIG. 5B illustrates a timing diagram of an example operation of the true random number generator (TRNG) of FIG. 5A in accordance with another aspect of the disclosure.

FIG. 5B illustrates a timing diagram of an example operation of the true random number generator (TRNG) 500 in accordance with another aspect of the disclosure. The x- or horizontal-axis represents time. From top to bottom, the y- or vertical-axis represents voltage levels or logic states of the sequence of random bits pm_out, the sampling clock (SCLK), and the output sequence of random numbers or bits OUT.

Note that in this example, the frequency of the sampling clock (CLK) is around three times (3×) less than the mean frequency of the sequence of random numbers or bits pm_out. This is because by generating the sequence of random numbers or bits pm_out based on period-to-period variation or period jitter in the sequence of random logically alternating bits Bn, the manufacturing mismatch within the TRNG cell 510 does not substantially affect the randomness of the sequence of random bits pm_out. Accordingly, the sampling interval need not be as large (e.g., 10× as in TRNG 400) to accumulate randomness for generating the output sequence of random numbers or bits OUT. Thus, the TRNG 500 may generate the output sequence of random numbers or bits OUT with a substantially higher mean frequency.

Also, because the TRNG 500 has improved randomness, the TRNG cell 510 need not be configured with many parallel (e.g., M=8) TRNG sub-cells as in the case of TRNG cell 300. For instance, the TRNG cell 510 may be configured with two TRNG sub-cells (M=2) more for redundancy purposes as oppose to randomness purposes. Further, although the TRNG 500 includes the period monitor 520, in terms of circuit area savings, the TRNG 500 may be configured with a smaller footprint as TRNG 400 because less parallel TRNG sub-cells are needed, and often, the TRNG 400 may further include a linear-feedback shift register (LFSR) that is seeded by the output sequence of random bits OUT in TRNG 400, which occupies additional circuit area.

With reference again to the timing diagram, during the first sampling (e.g., rising) edge of the sampling clock (SCLK) at time to, the pm_out signal is at a logic one. This means that at time $t_0$, the current period p(n) is greater than the previous period p(n−1). In response to the sampling edge of the sampling clock (SCLK), the flip-flop 530 outputs the current value of the sequence of random numbers of bits OUT as a logic one (1). During the second sampling edge of the sampling clock (SCLK) at time $t_1$, the pm_out signal is at a logic zero (0). This means that at time $t_1$, the current period p(n) is less than the previous period p(n−1). In response to the sampling edge of the sampling clock (SCLK), the flip-flop 530 outputs the current value of the sequence of random numbers of bits OUT as a logic zero (0). The sampling of the pm_out signal continues with the values of the output sequence of random numbers or bits OUT being 0, 1, 0, 0, 0, 1, 1, 1, 0, 0, 1, and 0 at times $t_2$ to $t_{13}$, respectively.

Figure 6:
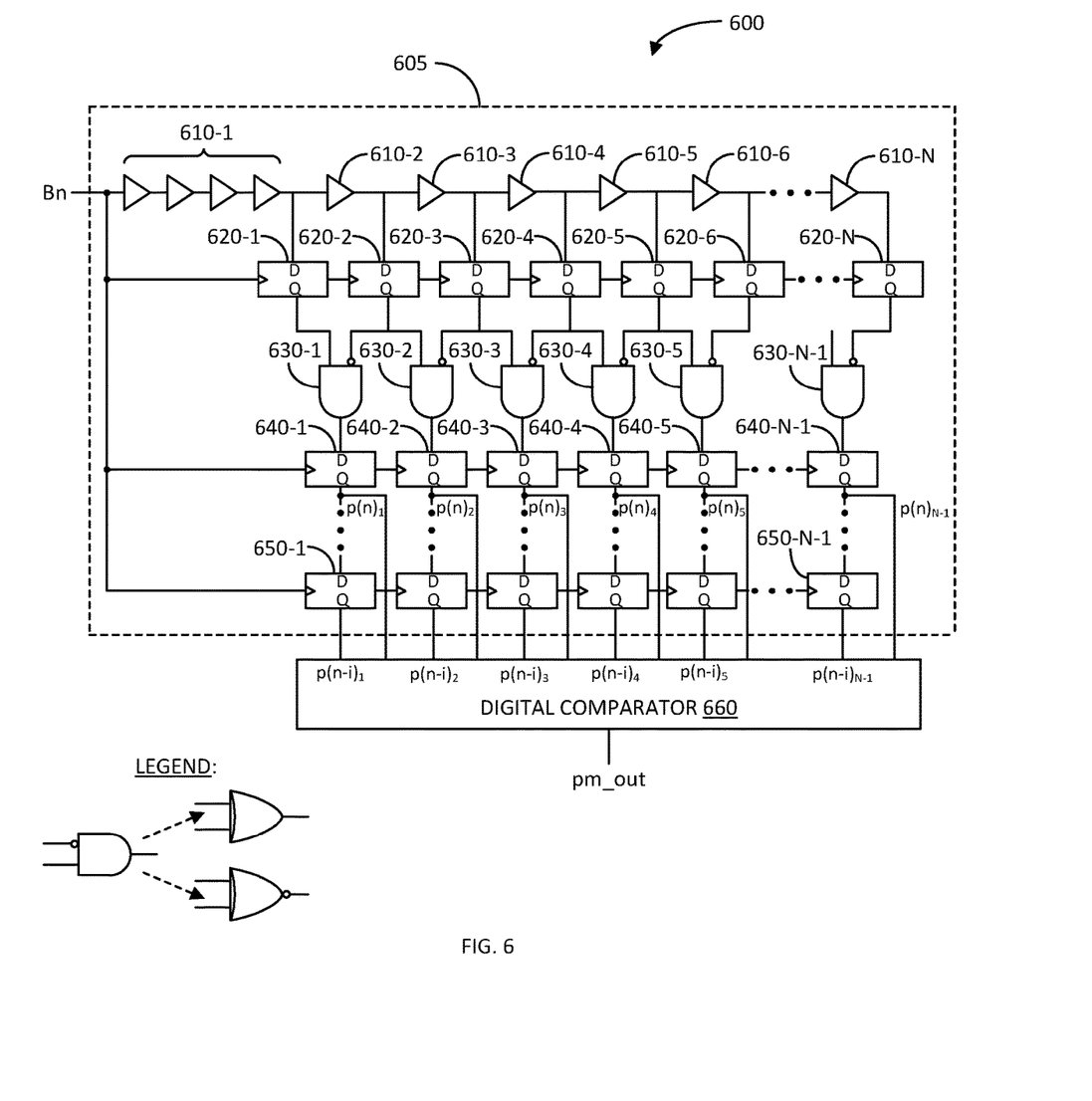
FIG. 6 illustrates a block diagram of another example true random number generator (TRNG) in accordance with another aspect of the disclosure.

FIG. 6 illustrates a block diagram of another example true random number generator (TRNG) 600 in accordance with another aspect of the disclosure. The TRNG 600 may be an example implementation of the TRNG 500 previously discussed. The TRNG 600 includes a TRNG cell (not explicitly illustrated) configured to generate a sequence of bits Bn logically alternating with a mean frequency and substantially random jitter Bn, an edge detector 605, a digital comparator 660, and a sampling flip-flop (not explicitly illustrated) configured to sample a sequence of random bits pm_out generated by the digital comparator 660.

The edge detector 605 includes a set of cascaded delay elements 610-1 to 610-N, each of which may be configured as one or more buffers or inverters. The input of the first delay element 610-1 is coupled to an output of the TRNG cell configured to generate the sequence of logically alternating bits Bn. The cumulative delay of the set of cascaded delay elements 610-1 to 610-N may be configured to be substantially longest statistical period of the sequence of logically alternating bits Bn. The cumulative delay of the first delay element 610-1 (which is illustrated as including a subset of cascaded delay elements) may be configured to be at substantially the shortest statistical period of the sequence of logically alternating bits Bn. In this configuration, the rising edge of the current period p(n) can be detected at the output of one of the delay elements 610-1 to 610-N at the time of the rising edge of the next period p(n+1). This is manifested by the delay element that captures the edge outputting a logic one (1), the delay element(s) preceding the delay element that captures the rising edge outputting logic zeros (0s), and the delay element(s) following the delay element that captures the rising edge outputting logic ones (1s).

The edge detector 605 further includes a set of flip-flips 620-1 to 620-N. The set of flip-flops 620-1 to 620-N include data inputs (D) coupled to the outputs of the set of delay elements 610-1 to 610-N, respectively. The set of flip-flops 620-1 to 620-N includes clock inputs coupled to an output of the TRNG cell generating Bn. The edge detector 605 further includes a set of logic gates (e.g., AND gates) 630-1 to 630-N−1. Each of the AND gates 630-1 to 630-N−1 include a non-inverting input and an inverting input coupled to the data outputs (Q) of consecutive distinct pairs of the set of flip-flips 620-1 to 620-N.

For example, the AND gate 630-1 includes non-inverting and inverting inputs coupled to the data outputs (Q) of consecutive pair of flip-flops 620-1 and 620-2, respectively. The AND gate 630-2 includes non-inverting and inverting inputs coupled to the data outputs (Q) of consecutive pair of flip-flops 620-2 and 620-3, respectively. The AND gate 630-3 includes non-inverting and inverting inputs coupled to the data outputs (Q) of consecutive pair of flip-flops 620-3 and 620-4, respectively; and so on, to the AND gate 630-N−1 including non-inverting and inverting inputs coupled to the data outputs (Q) of consecutive pair of flip-flops 620-N−1 and 620-N, respectively. It shall be understood that the AND gates 630-1 to 630-N−1 may be replaced with XOR or XNOR gates as indicated in the legend of FIG. 6, as they perform equivalent or similar logic operations in this case.

The edge detector 605 further includes a second set of flip-flops 640-1 to 640-N−1 including data inputs (D) coupled to outputs of the AND gates 630-1 to 630-N−1, respectively. The second set of flip-flops 640-1 to 640-N−1 includes clock inputs coupled to the output of the TRNG cell generating Bn. The second set of flip-flops 640-1 to 640-N−1 include data outputs (Q) configured to generate signal $p(n)_1$ to $p(n)_{N-1}$ indicative of the current period p(n). That is, the component of the signal $p(n)_1$ to $p(n)_{N-1}$ that is a logic one (1) (the remaining being logic zeros (0s)) is indicative of the current period p(n).

The edge detector 605 further includes at least another or third set of flip-flops 650-1 to 650-N−1. The third set of flip-flops 650-1 to 650-N−1 includes data inputs (D) coupled to the data outputs (Q) of the second set of flip-flops 640-1 to 640-N−1 either directly if "i" is one (1) or via one or more sets of flip-flops if "i" is greater than one. That is, if the immediate previous period p(n−1) is to be measured (i=1), then the data inputs (D) of the third set of flip-flops 650-1 to 650-N−1 may be directly coupled to the data outputs of the second set of flip-flops 640-1 to 640-N−1, respectively. If the $i^{th}$ previous period p(n−1) is to be measured (i>1), then the data inputs (D) of the third set of flip-flops 650-1 to 650-N−1 may be coupled to the data outputs of the second set of flip-flops 640-1 to 640-N−1 via i−1 set(s) of flip-flops, respectively.

The third set of flip-flops 650-1 to 650-N−1 includes clock inputs coupled to the TRNG cell generating Bn. The third set of flip-flops 650-1 to 650-N−1 include data outputs (Q) configured to generate the signal $p(n-i)_1$ to $p(n-i)_{N-1}$ indicative of the previous period p(n−i). That is, the component of the signal $p(n-i)_1$ to $p(n-i)_{N-1}$ that is a logic one (1) (the remaining being logic zeros (0s)) is indicative of the previous period p(n−i).

The data outputs (Q) of the second and third sets of flip-flops 640-1 to 640-N−1 and 650-1 to 650-N−1 are coupled to inputs of the digital comparator 660, respectively. As previously discussed, the digital comparator 660 generates a sequence of random numbers or bits pm_out based on a comparison of the current and previous period signals p(n) and p(n−i). For example, as discussed, if the current period p(n) is greater than the immediate previous period p(n−1), then the digital comparator 660 may generate or set the current bit pm_out(n) of the sequence of random bits pm_out as a logic one. If the current period p(n) is less than the immediate previous period p(n−1), then the digital comparator 660 may generate or set the current bit pm_out (n) of the sequence of random bits pm_out as a logic zero. If the current period p(n) is the same as the length of the immediate previous period p(n−1) as determined based on the resolution of the edge detector 605, then the digital comparator 660 may generate or set the current bit pm_out (n) of the sequence of random bits pm_out with the same value as the previous bit pm_out(n−1). It shall be understood that the digital comparator 660 may generate the sequence of random numbers or bits pm_out in different manners based on the values of p(n) and p(n−i).

Figure 7:
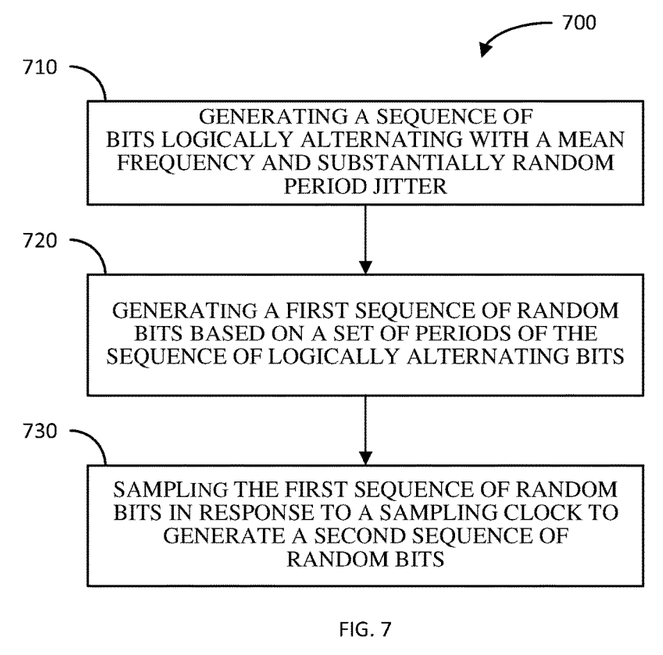
FIG. 7 illustrates a flow diagram of an example method of generating random number or bits in accordance with another aspect of the disclosure.

FIG. 7 illustrates a flow diagram of an example method 700 of generating random number or bits in accordance with another aspect of the disclosure. The method 700 includes generating a sequence of bits logically alternating with a mean frequency and substantially random period jitter (block 710). Examples of means for generating a sequence of bits logically alternating with mean frequency and substantially random period jitter include any of the TRNG cells 200 or 300 previously discussed.

The method 700 further includes generating a first sequence of random bits based on a set of periods of the sequence of logically alternating bits (block 720). Examples of means for generating a first sequence of random bits based on a set of periods of the sequence of logically alternating bits include any of the period monitor 520 and the one in TRNG 600 described herein.

Additionally, the method 700 includes sampling the first sequence of random bits in response to a sampling clock to generate a second sequence of random bits (block 730). Examples of means for sampling the first sequence of random bits in response to a sampling clock to generate a second sequence of random bits include the sampling circuit or flip-flop 530 described herein.

Figure 8:
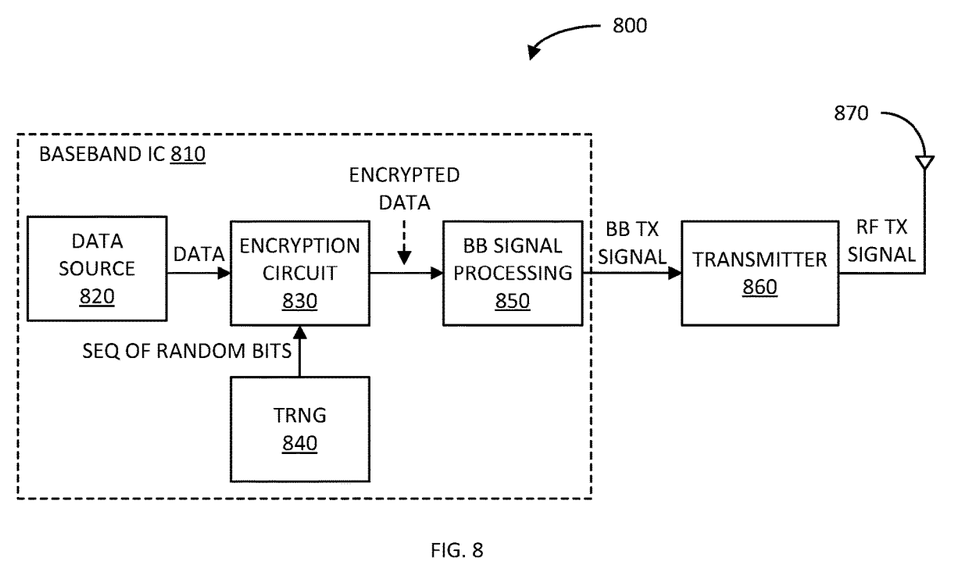
FIG. 8 illustrates a block diagram of an example wireless communication device in accordance with another aspect of the disclosure.

FIG. 8 illustrates a block diagram of an example wireless communication device 800 in accordance with another aspect of the disclosure. The wireless communication device 800 may take the form of a smart phone, personal computer, laptop computer, computing pad, Internet of Things (IoT) devices, vehicle traffic control devices, sensors, and others. In this example, the wireless communication device 800 is configured to wirelessly transmit a signal including data encrypted based on a sequence of random bits generated by any of the true random number generators (TRNG) described herein.

The wireless communication device 800 includes a baseband integrated circuit (IC) 810, which may be configured as a system on chip (SOC). The baseband IC 810 includes a data source 820 configured to generate data, and an encryption circuit 830 configured to encrypt the data based on a sequence of random bits generated by a TRNG 840. The TRNG 840 may be configured similar to TRNG 500 and 600 previously discussed.

The baseband IC 810 further includes a baseband (BB) signal processing circuit 850 configured to generate a baseband (BB) transmit (Tx) signal including the encrypted data. For example, the BB signal processing circuit 850 may apply error correction encoding to the encrypted data, modulate the encoded data to generate data symbols, place the signal into one or more frames with other signaling for frame detection, synchronization, automatic gain control (AGC), channel estimation, beam forming, etc.

The wireless communication device 800 further includes a transmitter 860 configured to process the BB Tx signal from the baseband IC 810 to generate a radio frequency (RF) transmit (Tx) signal. For example, the transmitter 860 may convert the BB Tx signal from digital to analog, frequency upconvert the analog BB Tx signal to generate an RF signal, and power amplify the RF signal to generate the RF Tx signal. The RF Tx signal is then provided to an antenna 870 for wirelessly transmitting the signal to one or more other wireless communication devices. Although the wireless communication device 800 is described as transmitting signals, it shall be understood that the wireless communication device 800 may be able to receive and process signals from one or more other wireless communication devices.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
   a true random number generator (TRNG) cell including an output to produce a first signal including a sequence of logically alternating bits;
   a period monitor including an input coupled to the output of the TRNG cell, wherein the period monitor is configured to generate a second signal based on a comparison of distinct pairs of periods of the first signal; and
   a flip-flop including a data input coupled to an output of the period monitor, a clock input to receive a sampling clock, and a data output to generate a sequence of random bits based on the second signal.

2. The apparatus of claim 1, wherein the TRNG cell comprises:
   a first TRNG sub-cell comprising:
      a first set of cross-coupled inverters;
      a first pre-charging circuit coupled to the first set of cross-coupled inverters; and
      an exclusive OR gate including inputs coupled to the first set of cross-coupled inverters; and
   a second TRNG sub-cell comprising:
      a second set of cross-coupled inverters;
      a second pre-charging circuit coupled to the second set of cross-coupled inverters; and
      an exclusive NOR gate including inputs coupled to the second set of cross-coupled inverters, and an output coupled to the first pre-charging circuit, wherein an output of the exclusive OR gate is coupled to an input of the second pre-charging circuit.

3. The apparatus of claim 1, wherein the TRNG cell comprises:
   a set of TRNG sub-cells; and
   a set of one or more exclusive OR gates including inputs coupled to outputs of the set of TRNG sub-cells, respectively.

4. The apparatus of claim 1, wherein the period monitor comprises:
   an edge detector including an input coupled to the output of the TRNG cell; and
   a digital comparator including a set of inputs coupled to a set of outputs of the edge detector, and an output serving as the output of the period monitor.

5. An apparatus, comprising:
   a true random number generator (TRNG) cell including an output;
   a period monitor including an input coupled to the output of the TRNG cell, wherein the period monitor comprises:

an edge detector including an input coupled to the output of the TRNG cell, wherein the edge detector comprises:
  a set of cascaded delay elements including an input coupled to the input of the period monitor;
  a first set of flip-flops including a first set of data inputs coupled to a set of outputs of the set of cascaded delay elements, respectively, a first set of clock inputs coupled to the input of the period monitor, and a first set of data outputs;
  a set of logic gates, wherein each logic gate includes inputs coupled to a distinct pair of the first set of data outputs of the first set of flip-flops;
  a second set of flip-flops including a second set of data inputs coupled to a set of outputs of the set of logic gates, respectively, a second set of clock inputs coupled to the input of the period monitor, and a second set of data outputs; and
  a third set of flip-flops including a third set of data inputs coupled to the second set of data outputs, respectively, a third set of clock inputs coupled to the input of the period monitor, and a third set of data outputs; and
  a digital comparator including a set of inputs coupled to the second and third sets of data outputs of the edge detector, and an output serving as the output of the period monitor; and
a flip-flop including a data input coupled to the output of the period monitor, a clock input to receive a sampling clock, and a data output to generate a sequence of random bits.

6. The apparatus of claim 5, wherein each of the set of logic gates comprises an AND gate including an inverting input and a non-inverting input.

7. The apparatus of claim 5, wherein each of the set of logic gates comprises an exclusive OR gate or exclusive NOR gate.

8. The apparatus of claim 5, wherein the third set of data inputs are coupled to the second set of data inputs via one or more other sets of flip-flops, respectively.

9. An apparatus, comprising:
a true random number generator (TRNG) cell configured to generate a sequence of bits logically alternating with a mean frequency and substantially random period jitter;
a period monitor configured to generate a first sequence of random bits based on a comparison of distinct pairs of a set of periods of the sequence of logically alternating bits; and
a sampling circuit configured to sample the first sequence of random bits in response to a sampling clock to generate a second sequence of random bits.

10. The apparatus of claim 9, wherein the period monitor comprises an edge detector configured to generate first and second signals indicative of lengths of first and second periods of the set of periods, respectively.

11. The apparatus of claim 10, wherein the period monitor further comprises a digital comparator configured to generate the first sequence of random bits based on the first and second signals.

12. The apparatus of claim 11, wherein the digital comparator is configured to:
set a first bit of the first sequence of random bits to a first logic state in response to the first and second signals indicating that the first period is greater than the second period;
set the first bit of the first sequence of random bits to a second logic state in response to the first and second signals indicating that the first period is less than the second period; and
set the first bit of the second sequence of random bits to a third logic state in response to the first and second signals indicating that the first period is substantially the same as the second period.

13. The apparatus of claim 12, wherein the first logic state comprises a logic one, the second logic state comprises a logic zero, and the third logic state is the same as a logic state of a second bit of the first sequence of random bits immediately preceding the first bit.

14. The apparatus of claim 10, wherein the edge detector comprises:
  a set of cascaded delay elements configured to receive the sequence of logically alternating bits;
  a first set of flip-flops including a first set of data inputs coupled to a set of outputs of the set of cascaded delay elements, respectively, a first set of clock inputs configured to receive the sequence of logically alternating bits, and a first set of data outputs;
  a set of logic gates, wherein each logic gate includes inputs coupled to a distinct pair of the first set of data outputs of the first set of flip-flops;
  a second set of flip-flops including a second set of data inputs coupled to a set of outputs of the set of logic gates, respectively, a second set of clock inputs configured to receive the sequence of logically alternating bits, and a second set of data outputs configured to generate the first signal; and
  a third set of flip-flops including a third set of data inputs coupled to the second set of data outputs, respectively, a third set of clock inputs configured to receive the sequence of logically alternating bits, and a third set of data outputs configured to generate the second signal.

15. The apparatus of claim 9, wherein a frequency of the sampling clock is less than the mean frequency of the sequence of logically alternating bits.

16. The apparatus of claim 9, wherein the sampling circuit comprises a flip-flop including a data input configured to receive the first sequence of random bits, a clock input configured to receive the sampling clock, and an output configured to generate the second sequence of random bits.

17. The apparatus of claim 9, wherein the TRNG cell comprises:
a first TRNG sub-cell comprising:
  a first set of cross-coupled inverters;
  a first pre-charging circuit coupled to the first set of cross-coupled inverters; and
  an exclusive OR gate including inputs coupled to the first set of cross-coupled inverters; and
a second TRNG sub-cell comprising:
  a second set of cross-coupled inverters;
  a second pre-charging circuit coupled to the second set of cross-coupled inverters; and
  an exclusive NOR gate including inputs coupled to the second set of cross-coupled inverters, and an output coupled to the first pre-charging circuit, wherein an output of the exclusive OR gate is coupled to an input of the second pre-charging circuit.

18. The apparatus of claim 9, wherein the TRNG cell comprises:
a set of TRNG sub-cells; and
a set of one or more exclusive OR gates including inputs coupled to outputs of the set of TRNG sub-cells, respectively.

19. A method, comprising:
generating a sequence of bits logically alternating with a mean frequency and substantially random period jitter;
generating a first sequence of random bits based on comparing distinct pairs of a set of periods of the sequence of logically alternating bits; and
sampling the first sequence of random bits in response to a sampling clock to generate a second sequence of random bits.

20. The method of claim 19, wherein generating the first sequence of random bits comprises generating first and second signals indicative of lengths of first and second periods of the set of periods, respectively.

21. The method of claim 20, wherein generating the first sequence of random bits comprises comparing the first and second signals.

22. The method of claim 20, wherein generating the first sequence of random bits:
setting a first bit of the first sequence of random bits to a first logic state in response to the first and second signals indicating that the first period is greater than the second period;
setting the first bit of the first sequence of random bits to a second logic state in response to the first and second signals indicating that the first period is less than the second period; and
setting the first bit of the second sequence of random bits to a third logic state in response to the first and second signals indicating that the first period is substantially the same as the second period.

23. The method of claim 22, wherein the first logic state comprises a logic one, the second logic state comprises a logic zero, and the third logic state is the same as a logic state of a second bit of the first sequence of random bits immediately preceding the first bit.

24. The method of claim 19, wherein a frequency of the sampling clock is less than the mean frequency of the sequence of logically alternating bits.

25. A wireless communication device, comprising:
a true random number generator, comprising:
a true random number generator (TRNG) cell including an output to produce a first signal including a sequence of logically alternating bits;
a period monitor including an input coupled to the output of the TRNG cell, wherein the period monitor is configured to generate a second signal based on a comparison of distinct pairs of periods of the first signal; and
a flip-flop including a data input coupled to an output of the period monitor, a clock input to receive a sampling clock, and a data output to generate a sequence of random bits;
a data source configured to generate data;
an encryption circuit configured to encrypt the data based on the sequence of random bits; and
a transmitter configured to wirelessly transmit a signal including the encrypted data.

26. The wireless communication device of claim 25, wherein the period monitor comprises an edge detector including an input coupled to the output of the TRNG cell.

27. The wireless communication device of claim 26, wherein the period monitor further comprises a digital comparator including a set of inputs coupled to a set of outputs of the edge detector, and an output serving as the output of the period monitor.

28. The wireless communication device of claim 26, wherein the edge detector comprises:
a set of cascaded delay elements including an input coupled to the input of the period monitor;
a first set of flip-flops including a first set of data inputs coupled to a set of outputs of the set of cascaded delay elements, respectively, a first set of clock inputs coupled to the input of the period monitor, and a first set of data outputs;
a set of logic gates, wherein each logic gate includes inputs coupled to a distinct pair of the first set of data outputs of the first set of flip-flops;
a second set of flip-flops including a second set of data inputs coupled to a set of outputs of the set of logic gates, respectively, a second set of clock inputs coupled to the input of the period monitor, and a second set of data outputs; and
a third set of flip-flops including a third set of data inputs coupled to the second set of data outputs, respectively, a third set of clock inputs coupled to the input of the period monitor, and a third set of data outputs;
wherein the output of the period monitor comprises the second and third sets of data outputs.

29. The wireless communication device of claim 28, wherein each of the set of logic gates comprises an AND gate including an inverting input and a non-inverting input, an exclusive OR gate, or exclusive NOR gate.

30. The wireless communication device of claim 28, wherein the third set of data inputs are coupled to the second set of data inputs via one or more other sets of flip-flops, respectively.

* * * * *